May 21, 1940.   C. NORDMANN   2,201,740
METHOD FOR PRODUCING COPIES OF LENTICULAR COLOR PHOTOGRAPHS
Filed March 9, 1938

Inventor:
Charles Nordmann,
Attorneys

Patented May 21, 1940

2,201,740

UNITED STATES PATENT OFFICE 2,201,740

METHOD FOR PRODUCING COPIES OF LENTICULAR COLOR PHOTOGRAPHS

Charles Nordmann, Paris, France

Application March 9, 1938, Serial No. 194,922
In France March 13, 1937

9 Claims. (Cl. 88—24)

The present invention relates to methods of producing sets of distinct monochromatic copies of lenticular color photographs, either on separate photographic elements or on a common photographic element.

It has already been suggested, in order to obtain such copies, to interpose between the photograph and the copies to be obtained a diaphragm corresponding to the color filter (generally trichromatic) used for taking the photograph, and successively to mask by means of different areas of said diaphragm the light emanating from the photograph to be copied so as to leave only one monochromatic image uncovered at a time.

This method of producing monochromatic copies has proved unsatisfactory. It could not be employed for practical purposes because the monochromatic copies thus obtained could not be superposed to one another, because the rays of light, passing through the excentrically disposed area of the diaphragm and the corresponding marginal portions of the optical system, given an image whose dimensions is different of those of an image obtained by the rays traversing the central area of said diaphragm.

The object of the present invention is to reduce or to eliminate this drawback by rendering the alterations of the different monochromatic images thus obtained substantially equal to each other.

With this object in view, an essential feature of the present invention consists in arranging the optical means associated with said diaphragm for forming the copied images of the photograph on a such manner that substantially the optical centers of gravity of the unmasked areas of the diaphragm are seen substantially in the same directions from the center of the copy.

Other features of the present invention will result from the following detailed description of some specific embodiments of the present invention, given merely by way of example, and in which.

Figure 1:
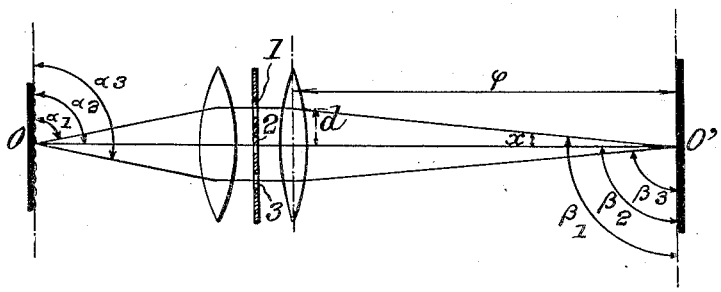
Fig. 1 is a diagrammatical view of a system for making copies of a lenticular color photograph.

In the example illustrated by Fig. 1, the lenticular color photograph, used for producing monochromatic copies, is supposed to have been obtained by means of a trichromatic filter, as is most generally the case. The photograph is shown on the left hand side of the drawing, its center being designated by 0. The copy, to be obtained, is shown on the right hand side, its center being designated by 0'. A diaphragm, having apertures 1, 2 and 3 corresponding to the three color bands of the filter used for taking the photograph, is associated with the optical means for forming the copies of the photograph.

For obtaining a monochromatic copy two of said apertures are masked and the third aperture, corresponding to the copy to be obtained, remains uncovered. The same element may thus be used for providing the three diaphragms intervening in the production of the three monochromatic copies.

I will call $\alpha_1$, $\alpha_2$, $\alpha_3$ the angles made by the photograph with respective lines leading from center 0 to the optical centers of gravity of the diaphragms corresponding to the copy of the three monochromatic images supplied respectively by the three apertures 1, 2 and 3. In a likewise manner, I will call $\beta_1$, $\beta_2$, $\beta_3$ the angles made by the plane of the copies with respective lines leading from center 0' to the same optical centers of gravity, all these angles being, for instance, measured from 0 to 180° in the clockwise direction.

Of course, these are conditions for obtaining a perfect registering of the three copies but a perfectly accurate registering of the respective monochromatic copies is not necessary, and is not even useful because the power of definition of lenticular photographs is limited, whatever be the precision of the optical means used by the width of each lenticular element. In order to obtain a practical solution of the problem, it suffices that the accuracy of superposition, that is to say the registering of the monochromatic copies obtained, should be ensured within the limits of accuracy thus defined.

I. Concerning first angles $\alpha_1$, $\alpha_2$, $\alpha_3$, these angles depend, especially in the case of films having a cylindrical lenticular structure, upon the relative aperture of the selecting color filter serving to take the original photograph, together with the optical means associated therewith. If this filter is, in the usual manner, of symmetrical shape, and if the central band of the filter is for instance the selecting band corresponding to the aperture 2, angle $\alpha_2$ is equal to 90° and angles $\alpha_1$ and $\alpha_3$ are one greater and the other smaller than $\alpha_2$.

II. Concerning now angles $\beta_1$, $\beta_2$, and $\beta_3$, these angles, although resulting partly from the conditions under which the original photograph is taken, also depends upon other factors, some of which can be more or less adjustable, and which depend, as it will be hereinafter explained, by the conditions in which the copies are produced.

a. First of all, it is obvious that, to values of $\alpha_1$, $\alpha_2$, $\alpha_3$ given in advance, there correspond, with a centered copying system of the usual type, determined values of $\beta_1$, $\beta_1$, $\beta_3$ (Fig. 1). According to the present invention, I obtain, other things being equal, values of $\beta_1$, $\beta_2$, $\beta_3$ which are the nearer to one another as the center of the copy is at a greater distance from the plane of the diaphragm. Taking for instance the case considered and shown by Fig. 1, $\alpha_2 = \beta_2 = 90°$ for the median diaphragm 2. It will be seen that the lateral diaphragm 1, or rather its virtual image given by the optical system interposed between it and the copy, is seen, from the center O' of the corresponding copy, at an angle $\beta_1 = 90° + x$ and that $x$ is the smaller as distance $\varphi$ is greater, since $tg\ x$ is equal to $$\frac{d}{\varphi}$$

($\frac{1}{\varphi}$ being proportional to the convergence of the optical system behind the diaphragm). It is not possible, when making the copy, to modify $d$, which depends upon the conditions in which the original photograph was taken, but, it is possible to make $x$ as small as it is desired by reducing the convergence of the portion of the optical system behind the diaphragm. To sum up, the desired result (obtainment of values of $\beta_1$, $\beta_2$, $\beta_3$ as near as possible to equality) can be obtained by providing, in the optical system which projects the image on the copy, a focal length of the portion of said system behind the diaphragm as great as possible, other things being equal, in comparison with the focal length of the other portion of said optical system, located in front of the said diaphragm.

Practically, it has been found that, even with the usual values of $\alpha_1$, $\alpha_2$, $\alpha_3$ a substantial improvement of the registering with respect to one another of the monochromatic copies obtained is already ensured by making use, behind the diaphragm, of an optical system of a focal length equal to at least twice that of the optical system in front of said diaphragm.

If the photograph to be copied has been obtained, as it is frequently the case, by means of a filter located in front of a given lens system, the copying optical system may be constituted by a lens system identical to that used for taking the photograph, associated with another lens system the absolute aperture of which is but little different but the focal length of which is greater. This corresponds to producing monochromatic copies which are directly enlarged instead of being made of the same size and subsequently enlarged.

b. There are, according to the present invention, other means for obtaining, other things being equal, angles $\beta_1$, $\beta_2$, $\beta_3$ all three of substantially the same value. For instance, I will indicate a method which experience has taught to be efficient. It consists in making use, for the copy of some of the monochromatic copies, instead of a centered system, that is to say consisting of coaxially arranged lenses, of an optical system which is not centered, that is to say which includes at least two lens systems having different axes, that is to say, to be more specific, two axes parallel to each other.

Figure 2:
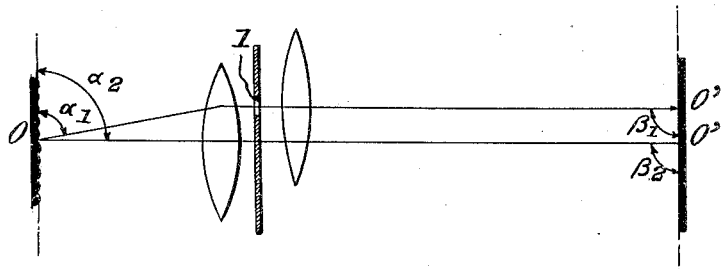
Fig. 2 is a similar view illustrating a particular feature of the invention.

Such a method is illustrated by Fig. 2. In this case, the photograph was taken with values of $\alpha_1$, $\alpha_2$, $\alpha_3$ substantially different from one another.

The problem is to obtain values of $\beta_1$, $\beta_2$, $\beta_3$ which are equal to one another.

Supposing, for instance, that $\alpha_2$ is equal to 90°, i. e. that the monochromatic copy corresponding to the central band 2 is obtained, in the usual manner, by means of a first lens system identical to the lens for taking the original photograph, said lens system being associated, on the other side of the diaphragm, with another lens system having a greater focal length, both of these lens systems and the central band being in coaxial relation, then $\beta_2$ is equal to $\alpha_2$, the whole being made according to the usual arrangement.

The problem is to obtain, for the other monochromatic copies, values of $\beta_1$ and $\beta_3$ equal to 90°, despite the fact that $\alpha_1$ and $\alpha_3$ are different from $\alpha_2$ and different from one another.

According to an interesting feature of the present invention, I displace parallelly to its axis the rear lens system in such manner that its axis passes through the optical center of gravity of the lateral aperture 1 or 3 of the diaphragm. Under these conditions $\beta_1$, $\beta_2$, and $\beta_3$ are obviously equal to 90°.

Experience teaches that this method permits of obtaining a considerable improvement of the accuracy of registering of the respective monochromatic copies with one another, even when the photgraph to be reproduced has been taken by means of a filter corresponding to a large relative aperture.

What I claim is:

1. An apparatus for making a set of elementary monochromatic copies of a lenticular color photograph, which comprises, in combination an optical system adapted to be interposed between said lenticular photograph and the copies to be obtained, a diaphragm for successively masking all but one of the respective monochromatic images, said diaphragm being inserted in said optical system, so that said optical system is divided into two portions, a front portion located before said diaphragm and a rear portion located behind said diaphragm, the focal length of said rear portion of the optical system being substantially greater than the focal length of said front portion.

2. An apparatus as claimed in claim 1 wherein the focal length of the rear portion of the optical system is greater than twice the focal length of the front portion of said system.

3. An apparatus for making a set of elementary monochromatic copies of a lenticular color photograph obtained by means of a lens system and a multiple color filter, which comprises, in combination, an optical system adapted to be interposed between said lenticular photograph and the copies to be obtained, a diaphragm corresponding to said color filter for successively masking all but one of the respective monochromatic images, said diaphragm being inserted in said optical system so as to divide it into two portions, one located in front of said diaphragm and the other located at the rear of said diaphragm, the front portion of said optical system consisting of a lens system identical to that used for taking the lenticular photograph and the other consisting of a lens system of a focal length equal to at least twice that of said front portion.

4. A method of producing three elementary monochromatic copies of a lenticular color photograph obtained by means of a trichromatic color filter of symmetrical arrangement, which comprises forming three respective images of said photograph on different sensitized elements through an optical system including a diaphragm corresponding to said filter and interposed in said system so as to divide it into two portions, located one in front of said diaphragm and the other at the rear thereof, the diaphragm being coaxial with the first portion of the optical system, whose first and second portion are relatively displaceable, parallelly to themselves in a direction transverse to their axes, masking every time a different group of two monochromatic portions of said diaphragm, and placing every time the rear and front portions of said optical system relatively in a direction at right angles to their axes so that lines at right angles to said images and passing through the respective centers thereof pass through the respective optical centers of gravity of said diaphragm portions corresponding to the monochromatic images to be copied.

5. Apparatus for making a monochromatic copy of a lenticular color photograph obtained by means of a lens system and a multiple color filter, said monochromatic copy corresponding to an eccentric color-zone of said filter, said apparatus comprising, in combination, an optical system adapted to be interposed between said lenticular photograph and the copy to be obtained, a diaphragm corresponding to said color filter for masking all zones of said filter except the one corresponding to the monochromatic copy to be obtained, said diaphragm being so inserted in said optical system as to divide it into two portions, one located in front of said diaphragm and the other located at the rear of said diaphragm, the front portion of said optical system being concentric to said diaphragm and the other portion being eccentric with respect thereto in such manner that the optical axis of the last named portion passes through the optical center of gravity of the unmasked diaphragm-zone and is parallel with the axis of said front portion of said optical system.

6. Apparatus for making a monochromatic copy of a lenticular color photograph obtained by means of a lens system and a multiple color filter, said monochromatic copy corresponding to an eccentric color-zone of said filter, said apparatus comprising, in combination, an optical system adapted to be interposed between said lenticular photograph and the copy to be obtained, a diaphragm corresponding to said color filter for masking all zones of said filter except the one corresponding to the monochromatic copy to be obtained, said diaphragm being so inserted in said optical system as to divide it into two portions, one located in front of said diaphragm and the other located at the rear of said diaphragm, the front portion of said optical system being concentric to said diaphragm and being adapted and arranged to refract all rays from the point of the photograph lying in the axis of said front portion into parallel relation with said axis, and the rear portion of said optical system being adapted and arranged to transmit such parallel rays at lesser angles with respect to the axis of the front portion than the angles which such rays emitted from said point form with said axis.

7. Apparatus for making a monochromatic copy of a lenticular color photograph obtained by means of a lens system and a multiple color filter, said monochromatic copy corresponding to an eccentric color-zone of said filter, said apparatus comprising, in combination, an optical system adapted to be interposed between said lenticular photograph and the copy to be obtained, a diaphragm corresponding to said color filter for masking all zones of said filter except the one corresponding to the monochromatic copy to be obtained, said diaphragm being so inserted in said optical system as to divide it into two portions, one located in front of said diaphragm and the other located at the rear of said diaphragm, the front portion of said optical system being concentric to said diaphragm and being adapted and arranged to refract all rays from the point of the photograph lying in the axis of said front portion into parallel relation with said axis, and the rear portion of said optical system being eccentric with respect to the axis of said front portion and being adapted and arranged to transmit such rays parallel to the axis of the front portion.

8. Apparatus for making a monochromatic copy of a lenticular color photograph obtained by means of a lens system and a multiple color filter, said monochromatic copy corresponding to an eccentric color-zone of said filter, said apparatus comprising, in combination, an optical system adapted to be interposed between said lenticular photograph and the copy to be obtained, a diaphragm corresponding to said color filter for masking all zones of said filter except the one corresponding to the monochromatic copy to be obtained, said diaphragm being so inserted in said optical system as to divide it into two portions, one located in front of said diaphragm and the other located at the rear of said diaphragm, the front portion of said optical system being concentric to said diaphragm and being adapted and arranged to refract all rays from the point of the photograph lying in the axis of said front portion into parallel relation with said axis, and the rear portion of said optical system being adapted and arranged to transmit such parallel rays at lesser angles with respect to the axis of the front portion than the angles which such rays emitted from said point form with said axis, said rear portion comprising lens means having a longer focus than the focus of said front portion.

9. Apparatus for making a monochromatic copy of a lenticular color photograph obtained by means of a lens system and a multiple color filter, said monochromatic copy corresponding to an eccentric color-zone of said filter, said apparatus comprising, in combination, an optical system adapted to be interposed between said lenticular photograph and the copy to be obtained, a diaphragm corresponding to said color filter for masking all zones of said filter except the one corresponding to the monochromatic copy to be obtained, said diaphragm being so inserted in said optical system as to divide it into two portions, one located in front of said diaphragm and the other located at the rear of said diaphragm, the front portion of said optical system being concentric to said diaphragm and being adapted and arranged to refract all rays from the point of the photograph lying in the axis of said front portion into parallel relation with said axis, and the rear portion of said optical system being eccentric with respect to the axis of said front portion and being adapted and arranged to transmit such rays parallel to the axis of the front portion, said rear portion comprising lens means having a longer focus than the focus of said front portion.

CHARLES NORDMANN.